(12) United States Patent
Ott et al.

(10) Patent No.: US 12,436,068 B2
(45) Date of Patent: Oct. 7, 2025

(54) 3D-PRINTED MASK FOR LYSING AT A LOCATION ON A TISSUE SECTION

(71) Applicant: TECAN TRADING AG, Männedorf (CH)

(72) Inventors: Philipp Ott, Steg (CH); Patrick Kinney, Hayward, CA (US); Adrian Sager, Männedorf (CH)

(73) Assignee: TECAN TRADING AG, Männedorf (CH)

( * ) Notice: Subject to any disclaimer, the term of this patent is extended or adjusted under 35 U.S.C. 154(b) by 0 days.

(21) Appl. No.: 18/723,218

(22) PCT Filed: Dec. 22, 2022

(86) PCT No.: PCT/US2022/053758
§ 371 (c)(1),
(2) Date: Jun. 21, 2024

(87) PCT Pub. No.: WO2023/122243
PCT Pub. Date: Jun. 29, 2023

(65) Prior Publication Data
US 2024/0418611 A1 Dec. 19, 2024

Related U.S. Application Data

(63) Continuation of application No. PCT/US2021/065085, filed on Dec. 23, 2021.

(51) Int. Cl.
*G01N 1/00* (2006.01)
*G01N 1/31* (2006.01)

(52) U.S. Cl.
CPC ..................................... *G01N 1/31* (2013.01)

(58) Field of Classification Search
None
See application file for complete search history.

(56) References Cited

U.S. PATENT DOCUMENTS

| 2005/0237607 A1 | 10/2005 | Tenney |
| 2009/0248145 A1* | 10/2009 | Chan .................... C12N 5/0691 435/378 |
| 2013/0029321 A1 | 1/2013 | Hansen et al. |

FOREIGN PATENT DOCUMENTS

| CN | 113702364 | 11/2021 |
| DE | 19742163 A1 | 4/1999 |
| DE | 102014214157 | 1/2016 |

(Continued)

OTHER PUBLICATIONS

International Search Report and Written Opinion of the ISA for PCT/US2022/053758 dated Mar. 28, 2023, 12 pages.

*Primary Examiner* — Jyoti Nagpaul
(74) *Attorney, Agent, or Firm* — Nixon & Vanderhye, P.C.

(57) ABSTRACT

Some embodiments are directed to a method for detaching tissue from a tissue section on a tissue slide. The method may include applying a 3D printed mask on top of the tissue section, the mask comprising barriers that define a cavity surrounding an area of interest on the tissue section, the cavity being open at a side facing the area of interest on the tissue section, dispensing a detaching liquid to the cavity, and allowing the detaching liquid to detach tissue at the area of interest, and aspirating the detaching liquid with the detached tissue from the cavity, and forwarding the liquid for further processing.

18 Claims, 5 Drawing Sheets

(56) References Cited

FOREIGN PATENT DOCUMENTS

| | | |
|---|---|---|
| EP | 0268237 | 5/1988 |
| RU | 2645646 | 2/2018 |
| WO | 2020131070 A1 | 6/2020 |
| WO | 2020131072 A1 | 6/2020 |
| WO | 2020132394 A1 | 6/2020 |

\* cited by examiner

3D-PRINTED MASK FOR LYSING AT A LOCATION ON A TISSUE SECTION

CROSS-REFERENCE TO RELATED APPLICATIONS

This application is the U.S. national phase of International Application No. PCT/US2022/053758 filed Dec. 22, 2022 which designated the U.S. and is the continuation of PCT/US2021/065085 filed Dec. 23, 2021, the entire contents of each of which are hereby incorporated by reference.

TECHNICAL FIELD

The presently disclosed subject matter relates to a method for detaching tissue from a tissue section on a tissue slide, a method for staining tissue from a tissue section on a tissue slide, a detaching device, a 3D printed mask arranged for applying on top of a tissue section, and a computer readable medium.

BACKGROUND

The international patent application WO2020131070, with title "Method of treating a sample", and included herein by reference, discloses a method of treating an isolated area of a sample with a liquid. A known method disclosed therein comprises the steps of:
generating an isolated area of a sample by means of a first liquid reservoir, the first liquid reservoir enclosing a distal end of a second liquid reservoir, and the isolated area of the sample being sealed towards the remaining area of the sample,
bringing the isolated area of the sample into liquid connection with the second liquid reservoir,
dispensing a liquid from the second liquid reservoir into the first liquid reservoir, thereby generating a liquid flow on the sample at the isolated area in a first direction, and
aspirating the liquid from the first liquid reservoir into the second liquid reservoir, thereby generating a liquid flow on the sample at the isolated area in a second direction.

For example, FIG. 9 of the above patent application shows a microscope image of a formalin fixed paraffin embedded (FFPE) section of a tissue. The corresponding description gives an example of treatment of the slide comprising the tissue section.

SUMMARY

Existing methods for detaching tissue from a tissue section may be improved. For example, a barrier or mask may be applied directly onto the tissue which holds back a detaching liquid such as a lysis buffer. The detaching liquid may be dispensed into the cavities formed by the mask. With this approach the detaching time is less critical since detachings can be done in parallel. After the detaching, the liquid may be collected for downstream processing.

For example, a method for detaching tissue from a tissue section on a tissue slide may comprise applying a 3D printed mask on top of the tissue section. The 3D mask may be printed directly onto the tissue section. The mask may comprise barriers that define a cavity surrounding an area of interest on the tissue section. A detaching liquid may be dispensed into the cavity, and later aspirated from the cavity together with detached tissue. A desired further processing may then be applied to the detached tissue, e.g., genomic analysis, storing the tissue, or the like. A tissue section is also sometimes referred to as a tissue slice.

The dispensing and aspirating may use a pipette tip arranged at a motorized pipettor arm. The pipetting tip may be arranged to cause detaching liquid to be dispensed to or aspirated from a cavity. Interestingly, between the dispensing and aspirating, the pipettor arm and/or tip may be applied otherwise. For example, the pipettor arm may be moved away from the cavity after dispensing. For example, the pipettor arm may be used to process a next area of interest, e.g., on the same or a different tissue section, possibly even on a different tissue slide. Another advantage is that tissue sections may be thicker than is conventional.

The barriers defining the cavity may be arranged to match the edges of an area of interest. The cavity that the barriers define may thus be an irregular shape, e.g., matching the contours of an area of interest. Likewise, the area and/or of volume of the cavity can be flexibly adapted to the current detaching, e.g., from a very small to a very large areas of interest.

Interestingly, the 3D mask may be printed directly onto the tissue section. This is advantageous as it allows increased automatization, higher throughput, and improved alignment with the area of interest. For example, the location of the 3D mask application, e.g., printing, may be determined from a first image of a stained tissue section on which the area of interest is visible, and/or, on which or with respect to which the area of interest is indicated. An image registration algorithm may be applied to register the first image to a second image of the tissue section on which the detachment is to take place and on which the 3D mask is to be applied. For example, coordinates of an area of interest identified in an image of the stained tissue section may be translated through the registration to coordinates of the area of interest in an image of an unstained tissue section, where 3D mask application and tissue detaching is to take place. The stained tissue section is typically stained in its entirety, although this is not necessary. A conventional staining method may be used to apply the staining, e.g., H&E staining.

Even the design of the 3D mask may be obtained from the first image, possibly with an intermediate determination of a 2D design. The 2D and/or 3D mask may be designed manually. For example, the 2D design may be done by hand, e.g., in a user interface; For example, on top of a picture of the stained slice. The 2D design may be generated automatically, e.g., by a computer, e.g., from the first image. For example, a mask design algorithm may be configured to draw a barrier around an indicated area of interest. The area of interest may be an input to the mask design algorithm, or may be obtained from the markings associated with a stained tissue section, or may be obtained from a machine learning algorithm. The mask design algorithm may be configured to add to optional features to a 3D design such as slopes at the outside of a 3D mask. For example, the mask design algorithm may optionally be configured to connect multiple areas of interest with a supporting structure Various positive effects can be obtained using an embodiment. For example, using a 3D mask means that no detaching chamber of predetermined size is needed, e.g., a so-called tip extender. The shape of a predetermined detaching chamber does not normally fit the shape of an area of interest. Typically, a tip extender is disc shaped, while areas of interest are not. As a result, the area of interest will need repeated detaching session, using many tip extenders, after which the full area of interest might still not be fully detached. Using a printed 3D mask can thus reduce the number of consumables needed. Likewise, reagent costs can be reduced. Concentration issues associated with the repeated detaching at multiple sites are also avoided.

Throughput can be significantly increased. This holds for a single area of interest since repeated detachings, e.g., so-called lysing cycles, may be avoided. Instead, a single detaching session may be performed in which the entire area of interest is detached. Throughput increases even more when use is made of the parallelism that a 3D mask allows. While a first area of interest is detaching, e.g., while lysing is in progress in a first cavity, a pipettor tip can dispense into a second cavity corresponding to a second area of interest. A detaching make take some time—a full detachment can take 8 minutes or even more, the opportunity to work in parallel can significantly improve throughput.

Because the shape of the 3D printed mask can match the contours of an area of interest, it is avoided to detach unwanted tissue, e.g., healthy tissue, or to miss wanted tissue, e.g., tumor tissue. This is especially true near the edge of the tissue slide, where the predetermined shape of a tip extender might extend beyond the border of the tissue slide. A printed mask can be applied close to the edge while still having a large surface area.

A detaching device and/or 3D printing device and/or a 3D mask generation device is an electronic device, which may comprise a computer, e.g., to control the 3D printing and/or detaching process.

An aspect is a detaching method, e.g., comprising detaching of tissue using a 3D printed mask, a 3D printing method, e.g., comprising 3D printing of a 3D mask arranged for use in the detaching method, and a 3D design method, e.g., comprising generation of a 2D and/or 3D mask design for use in the 3D printing method.

An aspect is a staining method, e.g., comprising staining of tissue using a 3D printed mask, a 3D printing method, e.g., comprising 3D printing of a 3D mask arranged for use in the staining method, and a 3D mask design method, e.g., comprising generation of a 2D and/or 3D mask design for use in the 3D printing method.

An embodiment of these methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale.

In the figures, elements which correspond to elements already described may have the same reference numerals. In the drawings, FIG. 1 schematically shows an example of an embodiment of a detaching device, FIG. 2 schematically shows an example of an embodiment of a detaching device, FIG. 3a schematically shows an example of an embodiment of a 3D printed mask applied on a tissue section, in side-view, FIG. 3b schematically shows an example of an embodiment of two 3D printed masks applied on a tissue section, in top-view, FIG. 4a schematically shows an example of a picture of a stained tissue section with marked areas of interest, FIG. 4b schematically shows an example of an embodiment of a 2D design for a 3D printed mask.

REFERENCE SIGNS LIST

Figure 1:
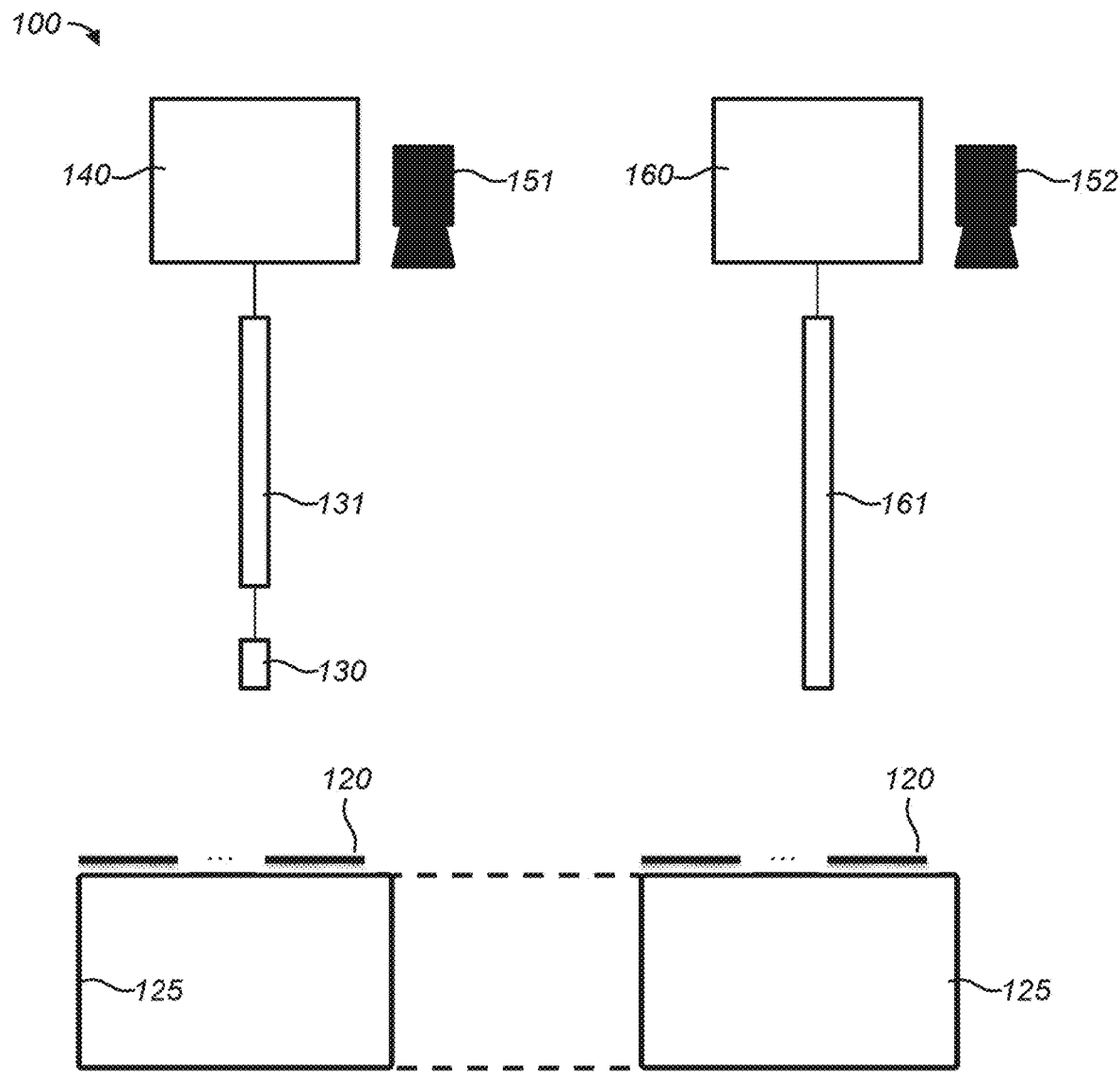

The following list of references and abbreviations corresponds to FIGS. 1-4c, and 6a-6b, and is provided for facilitating the interpretation of the drawings and shall not be construed as limiting the claims.

100 a detaching device
120 a slide
125 a slide support
130 pipetting tip
131 a pipetting arm
140 a detaching unit
151 a first camera
152 a second camera
160 a 3D printing unit
161 a 3D printing arm
210 a detaching device
230 a processor system
240 a storage
250 a communication interface
300 a tissue section
301 a 3D printed barrier
302 a cavity
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

FIG. 1 schematically shows an example of an embodiment of a detaching device 100. Detaching device 100 is an example of a detaching device that may be used in or with an embodiment, e.g., an embodiment of a detaching method or 3D printing method or detachment device.

Shown in FIG. 1 is a slide 120. Slide 120 is arranged for a tissue section to be applied to a slide surface. Parts of the tissue section are to be detached for further analysis, e.g., to extract biological molecules from the tissue, such as DNA material. For example, the tissue may be a biopsy tissue. Slide 120 is shown on top of a slide support 125. For example, slide support 125 may be arranged with a heating element for heating the tissue section on slide 120, e.g., during detaching such as lysing.

Detaching device 100 comprises a pipetting arm 131 with a pipetting tip 130 at an end of the pipetting arm. A pipetting arm is sometimes referred to as a pipetting channel. The pipetting arm is also referred to as the pipetting channel. The slide surface of slide 120 is facing the pipetting tip 130. Pipetting tip 130 is movable and can be configured for pipetting tip 130 to move to a particular defined location on the tissue section. Typically, pipetting arm 131 is motorized and arranged to be controlled by a computer program. The program may instruct the pipetting arm 131 and tip 130 for detaching at one or more locations on the tissue section. For example, pipetting arm 131 may be part of a robotic arm arranged to move tip 130 to a desired location on the tissue section.

The pipetting tip 130 is configured to enable the controlled exposure of chemicals to the tissue at the defined location. The tip may also allow dynamic liquid forces at the location to further promote detaching of the tissue section at the location. For example, shear forces may be applied to the tissue through the liquid.

The location on the tissue section, e.g., a part or area or region of the tissue section, comprises the material that is to be detached, e.g., to be detached. The location is also referred to as the area of interest (AoI). A detaching unit 140 may be configured to move pipetting tip 130 to the location on the tissue section, supply, and aspirate liquids to and from pipetting tip 130, and the like.

For example, the detaching liquid may be a lysing liquid. For example, the lysing liquid may be a lysing buffer. Applying the lysing liquid to an area of interest at the tissue section may cause the tissue in that area to be lysed. The lysing liquid together with the lysed tissue may then be referred to as the lysate.

The detaching liquid may comprise an enzyme suitable for detaching, which could be lysing but this is not necessary. The enzyme may or may not be a synthetic enzyme. Chaotropic salts could be used in addition or as alternative to enzymes. In an embodiment, the detaching liquid may comprise a lysis buffer, e.g., comprising proteinase K. The detaching liquid may be suitable for LC-MS-based proteomics. Detaching device 100 further comprises a 3D printing unit 160. 3D printing unit 160 comprises a 3D printing arm 161 for printing a 3D mask. The 3D mask may be applied to the tissue section by directly printing the 3D mask on top of the tissue section. The 3D mask may instead be printed separately, and then placed on top of the tissue section. FIG. 1 shows the 3D printing arm with access to tissue slide 120 on top of a support 125. This may be the same support as used for the detaching unit 140. However, preferably, the 3D printing part of detaching device 100 has a separate slide support 125.

The 3D printed mask comprises barriers that define a cavity surrounding an area of interest on the tissue section. The cavity is open at a side facing the area of interest on the tissue section, and arranged to receive the detaching liquid from the pipetting tip 130. The cavity comprises an inlet for receiving the detaching liquid. For example, the cavity may be at least partially open at a side opposite the tissue section. For example, the cavity may be connected to a liquid duct which in turn is arranged to receive detaching liquid from the pipetting tip 130. The cavity is also referred to as a detachment chamber. If lysing is used, this may be referred to as a lysing chamber.

The 3D printing may be done using additive manufacturing. For example, the 3D printing material may be plastic, which may be melted during the printing. The 3D printing material could also be a highly viscous liquid or gel. In the latter case, the 3D printing material could be dispensed by a pipette tip, e.g., a pipette tip on pipetting arm 131, e.g., tip 130. In this way a separate 3D printing unit may be avoided. Another option is to use a 3D material comprising two components. The components react on the slide to become solid. The components could be dispensed from separate pipetting tips or from the same tip.

Once the 3D printing mask is applied on the area of interest, a detaching liquid is dispensed into the cavity. Depending on the organization in detaching device 100, slide 120 with the 3D printed mask applied may be moved from a 3D printing part of device 100 to a detaching part, e.g., from the 3D printing unit 160 to the detaching unit 140; for example, this may use a slide moving mechanism. Instead of moving the slide, the units may be moved instead.

The detaching liquid is then allowed to detach tissue at the area of interest. Typically, this would happen in a separate incubator module, or incubator chamber. When the detaching has progressed sufficiently, the detaching liquid is aspirated together with the detached tissue from the cavity, e.g., by the pipetting tip 130. If lysing is used, the aspirated lysing liquid is referred to as the lysate. The liquid can then be forwarded for further processing, e.g., genomic analysis, transferred to a detaching liquid collection vessel for further processing, e.g., purification, or the like.

For example, detaching may comprise moving the motorized pipetting tip to the area of interest, dispensing a detaching liquid through the pipetting tip 131 into the cavity at an end of the pipetting tip at the area of interest, and later aspiring detached material. The detaching liquid in the detachment chamber may be heated to a detaching temperature.

Further information and examples of lysing can be found, e.g., in international patent publications WO2020131072 and WO2020132394, both of which are included herein by reference. These publications however use a tip extender, which is not needed when a 3D printed mask is used.

Detaching of tissue in this manner, especially automated or partially automated, is advantageous, as it is quick and reliable. Moreover, using a 3D printed mask has many advantages, e.g., a higher yield, allowing an irregular shaped area of inters, smaller areas of interest, and parallel processing of multiple locations.

For example, in a detaching iteration, detaching liquid may be provided to the detachment chamber, and after some time, e.g., after incubation, aspirated back together with detached material. The time the detaching liquid is in the chamber, as well as other factors, have an impact on the amount of material that is detached from the tissue slide.

A camera 151 may be included in detaching device 100 to take images of the tissue section before and/or during the tissue detachment, e.g., of lysing. Typically, an area of interest is defined on or with respect to a stained tissue section, while the detaching takes place at the same area but from an unstained tissue section, e.g., a different slice from the same tissue as the stained tissue section. Pictures of stained and unstained slice may be registered, so that a location defined with respect to the stained tissue can be translated to a location on the unstained slice for detaching. The same hold for the 3D printing. The 3D mask is typically defined with respect to the stained tissue section, e.g., a picture, thereof, but is applied to the unstained tissue section, e.g., printed thereon or placed thereon. 3D printing unit 160 can also use image registration to translate an area of interest or a design or the like, from the stained tissue section to the unstained tissue section for applying the mask.

In a stained tissue slice at least the area of interest is stained, however, for the above purpose, typically, the entire tissue section would be stained. For example, a conventional staining may be used, e.g., an H&E staining.

Moving the pipetting tip and/or 3D printing tip to and from the area of interest may be done with a movable arm, e.g., a motorized arm. For example, a robotic arm may be used. In an embodiment, camera 151 may be used to guide the arm towards the area of interest, although this is not necessary. In an embodiment, camera 152 may be used to guide the arm for printing towards the area of interest, although this is not necessary.

Slide 120 may comprise one or more fiducials to aid in locating the defined location in the camera image. Camera 151, 152 and/or said fiducials may be used by guiding software configured to guide pipetting arm 131 and printing arm 161 to the area of interest.

Figure 2:
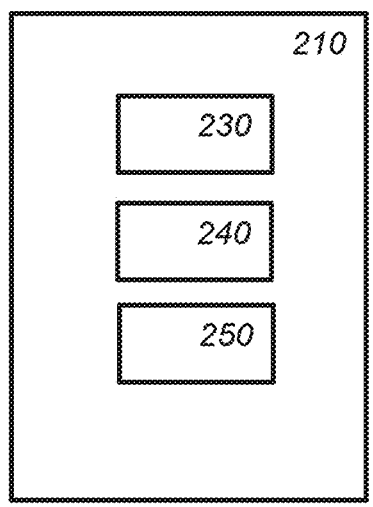

FIG. 2 schematically shows an example of an embodiment of a detaching device 210. For example, the detaching device 210 of FIG. 2 may be used to detach tissue from a tissue section. The detaching device 210 of FIG. 2 may be used to control a detaching unit, e.g., a pipetting arm, and/or a 3D printing unit, e.g., a 3D printing arm. Detaching device 210 may comprise a processor system 230, a storage 240, and a communication interface 250.

Storage 240 may comprise local storage, e.g., a local hard drive or electronic memory. Storage 240 may comprise non-local storage, e.g., cloud storage. In the latter case, storage 240 may comprise a storage interface to the non-local storage.

Detaching device 210 may communicate internally, with other systems, external storage, input devices, output devices, and/or one or more sensors over a computer network. The computer network may be an internet, an intranet, a LAN, a WLAN, etc. The computer network may be the Internet. The system comprises a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

In detaching device 210, the communication interface 250 may be used to send or receive digital data. For example, communication interface 250 may receive a picture of a stained tissue section, possibly together with markings that indicate an area of interest. For example, communication interface 250 may be used to receive commands and instructions. For example, communication interface 250 may be used to transmit results of tissue detachment analysis.

The execution of detaching device 210 may be implemented in a processor system, e.g., one or more processor circuits, e.g., microprocessors, examples of which are shown herein. The processor system may comprise one or more GPUs and/or CPUs. Detaching device 210 may comprise multiple processors, which may be distributed over different locations. For example, detaching device 210 may use cloud computing.

FIG. 1 shows functional units that may correspond to functional units of the processor system. For example, FIG. 1 may be used as a blueprint of a possible functional organization of the processor system. The processor circuit(s) are not shown separate from the units in these figures. For example, the functional units may be wholly or partially implemented in computer instructions that are stored at detaching device 210, e.g., in an electronic memory of detaching device 210, and are executable by a microprocessor of detaching device 210. In hybrid embodiments, functional units are implemented partially in hardware, e.g., as coprocessors, e.g., image coprocessors, and partially in software stored and executed on detaching device 210.

A Possible Workflow for Device 210 and/or 100 is as Follows.

1. Receiving a tissue slide comprising an unstained tissue section
2. Obtaining an area of interest on the unstained tissue section,
3. 3D printing a 3D mask matching the area of interest. The 3D printing may be directly on the tissue section.
4. Dispensing a detaching liquid into a cavity defined by the 3D mask, and covering the area of interest,
5. Allowing the detaching liquid to detach tissue at the area of interest,
6. Aspirating the detaching liquid with the detached tissue from the cavity,
7. Forwarding the liquid for further processing.

Each of these phases may be under the control of a computer program. Many variants and refinements are possible for these steps. Not all of these steps are required. For example, instead of 3D printing the mask, the mask may be 3D printing on a different machine, and received in printed form. Further details are discussed below.

Figure 3A:
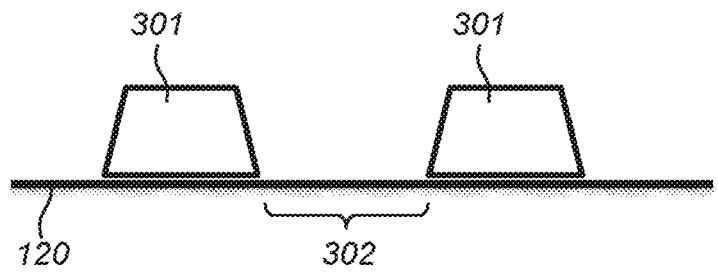

FIG. 3a schematically shows an example of an embodiment of a 3D printed mask applied on a tissue section, in side-view. Shown is a slide 120 on which a tissue section is placed having an area of interest of detaching. On the tissue section barriers are 3D printed defining a cavity 302. For example, in the cavity a detaching liquid, e.g., a lysis reagents may be dispensed. The tissue section and detaching liquid are then allowed to do the detaching, e.g., to incubate. For example, a lysing reagent may be heated to a temperature appropriate for the detaching liquid to work. For example, humidity may be controlled during the incubation, e.g., at say 95% rH. After some time, the liquid, e.g., the lysate, may be collected, e.g., using a pipetting tip. Finally, the liquid may be forwarded for some further processing, e.g., placed in a micro well, or send to a further device or the like.

Figure 3B:
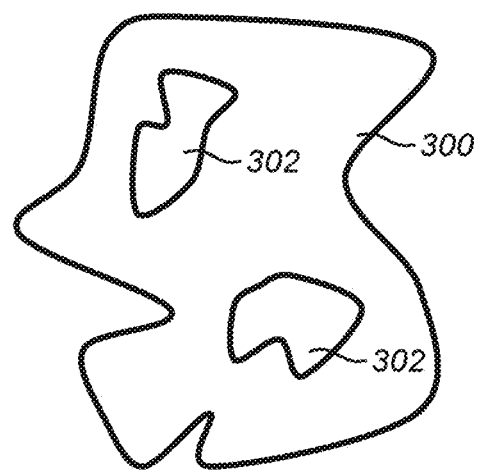

FIG. 3b schematically shows an example of an embodiment of two 3D printed masks applied on a tissue section 300, in top-view. FIG. 300 shows two areas of interest 302, around each of which a 3D printed barrier is applied. The two areas are allowed to incubate in parallel. Note that the areas of interest are both of an irregular shape, but can be detached completely.

Figure 4A:
FIG. 4c shows an example of 3D printed mask, FIG. 5 schematically shows an example of an embodiment of a method for detaching tissue, FIG. 6a schematically shows a computer readable medium having a writable part comprising a computer program according to an embodiment, FIG. 6b schematically shows a representation of a processor system according to an embodiment.

FIG. 4a schematically shows an example of a picture of a stained tissue section with marked areas of interest. For example, the areas of interest may be marked by a physician. For example, the areas of interest may represent suspect tumors which require a particular study. In this example, areas of interest have been indicated with marker pen. A picture of the stained tissue with markings gives information where the tissue in unstained tissue is to be detached.

Figure 4B:

FIG. 4b schematically shows an example of an embodiment of a 2D design for a 3D printed mask. The 2D design of FIG. 4b was obtained from the markings of FIG. 4a. Note that the black markings in FIG. 4a have been translated into open cavities in FIG. 4b (indicated in white). The cavities are surrounded with barriers, which in turn are connected in a supporting structure. Areas where detaching is undesirable, and which is not yet filled with barrier or supporting structure are filled up. These avoid inadvertent detaching at those locations, and give additional strength to the mask.

Figure 4C:
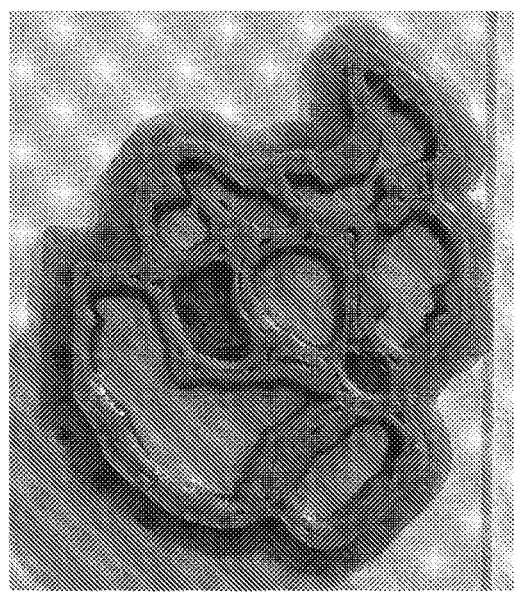

FIG. 4c shows an example of 3D printed mask. FIG. 4c shows a photograph of the printed mask. Note that at the outside of the mask, the outer barrier of the 3D-maks is provided with sloped edges. These ensure a better seal between mask and tissue. The 3D printed mask shown in FIG. 4c includes a number of beneficial but optional features. For example, multiple cavities, slopes, and supports between the cavities are optional features.

Using a 3D mask for detaching tissue may have several effects. For example, an entire area of interest can be detached at the same time, instead of having to detach it spot by spot. Furthermore, the shape of the area of interest can be highly irregular, and does not need to conform to a fixed shape of pipetting tip.

Using fewer detachment cycles is faster and also reduces the need for consumable, reagents, and so on. One individual detachment at one spot using a tip-extender in which flow is applied, is faster than one detachment using a 3D mask in which no flow is applied. The difference may be as much as a factor of 2 or 3. However, the detaching with a 3D mask does not block a pipetting arm and can be done in parallel, e.g., in an incubator. Moreover, an area of interest can be detached in one cycle without having to do multiple cycles at multiple spots. The resulting throughput using 3D masks is much higher.

Being able to detach an irregular area means that the amount of healthy tissue in the detachment area may be minimized and that it may be avoided to miss, say, tumor tissue outside the detachment area. Detaching areas of interest close to the edge of the slide using the background lysing method requires even more cycles as smaller spots are used. However, so long as the area of interest is about a barrier away from the edge, the location of the area of interest forms no objection when using 3D printed masks. Since detachment needs fewer cycles, and moreover multiple areas can be detached in parallel, the net throughput can be much higher.

Below many embodiments, and variants for detaching tissue from a tissue section are discussed.

In an embodiment, a detaching device, e.g., detaching device 100, or 210 or a method for detaching tissue is configured to receive a slide having a tissue section applied on the slide surface. For example, the slide may be a glass slide, or some other appropriate material. At least a tissue slide comprising an unstained tissue section is received. Embodiments may receive multiple tissue sections, possibly on multiple slides. Embodiments may also receive stained tissue sections, e.g., to steer the detaching and applying of the 3D mask.

In an embodiment, the tissue section is paraffined and/or formalin fixed. These are an important application since formalin fixes the tissue, e.g., the proteins. Paraffined and formalin fixed tissue is also known as FFPE tissue. It is not necessary though to restrict to FFPE tissue. In an embodiment, the tissue section is fresh frozen tissue.

An area of interest is obtained on the unstained tissue section. There are various ways this could be done. Note that multiple areas of interest may be defined.

In an embodiment, the area of interest may be defined by a user. For example, the user may define the area of interest by defining coordinates that indicate the area of interest. For example, the detaching device may be configured to image the slide before detaching, displaying said image in a user interface configured to enable the user to define the area of interest. For example, the user may indicate in a user interface the coordinates or the position in the image, etc. In an embodiment, the area of interest is defined by a user, e.g., through a user interface. For example, the detaching device may be configured to image the tissue section before detaching, displaying said image in a user interface configured to enable the user to define the location. Instead of an image of the tissue section to be detached, an image of a stained section of the same tissue may be used, e.g., presented to the user.

One or more locations may be defined by an algorithm, e.g., running in the tracking or detaching apparatus. An area of interest may be defined by an algorithm. For example, an algorithm may define a location where detaching is to take place. For example, an algorithm may define one or more areas of interest, where the tissue appearance diverges from regular tissue. For example, a neural network may identify locations where tissue is suspect, e.g., diverges from a norm. For example, an image recognition algorithm may be trained on images comprising areas of interest.

In an embodiment, a picture of a stained tissue section is obtained. The stained tissue section is different slice of the same tissue as the tissue section for detaching. For example, the stained tissue section may be received on a slide. A camera of the device may be used to picture the stained tissue section, e.g., camera 151 or 152. For example, the picture may be received at the detaching device digitally, e.g., from an external camera.

The picture of the stained tissue section may be used to identifying the area of interest. For example, as indicated above, a user may be presented with the picture in a user interface in which the user can indicate the area of interest. For example, a touchscreen may be used in which the area can be painted in.

In an embodiment, the area of interest is indicated on the stained tissue section, on a transparent, e.g., glass, cover of the stained tissue section, on a picture of the stained tissue section. For example, the marking may be physically done with a marker. Such markings are indicated in FIG. 4a. The markings may be done with a color that is easy to recognize digitally. For example, in FIG. 4a, hematoxylin & eosin (h&e) staining is used; in FIG. 4a, the markings are in black, while the stained tissue is purplish, making the marking easy to recognize, both by a human operator and by an image recognition algorithm.

Once the area of interest is obtained, whether from a stained image or not, or through a user interface, or through a marking, they may be used to generate a 2D design from the identified area of interest. The 2D design may be generated by hand, but may also be automatically generated. The design may be automatically generated but corrected if needed by a human operator. For example, an automated design may place barriers around the identified area(s) of interest. Between the area of interest a supporting structure may be applied, e.g., connecting the cavities. Larger areas between the cavities may be filled up with material.

Once a 2D design is available it may be converted to a 3D design, e.g., a design suitable for 3D printing. For example, the 2D design may be extended in the z-direction. It is not necessary that all parts of the 2D design are raised the same amount. For example, barriers may be raised to a level depending on the desired amount of detaching liquid the cavity should hold. As an example, a height of 3 mm may be used.

Supporting structures may have a lower height. Slicer software may be used to steer the 3D printing from the 3D design. Height may be indicated in a 2D design of the mask, as gray values.

The 3D mask can now be printed. Interestingly, a 3D mask may be obtained that matches the area of interest. In this way healthy tissue can be excluded from detaching while all or almost all unhealthy tissue can be included. For example, in an embodiment, different cavities are assigned to tumor tissue and to wild type tissue. The two types of tissue can be extract separately.

Advantageously the 3D printing can be done directly on the unstained tissue section. This is not necessary, for example, the 3D printing can be done separately, and applied to the tissue section after printing. For example, a 3D mask could be printed in an external printer and placed on the tissue section manually before detaching. While 3D printing direct on the tissue is preferred, placement of an externally 3D printed mask may still be beneficial over predetermined shapes; For example, even an externally 3D printed mask allows detaching of smaller areas of interest, and the detaching of multiple areas of interest, optionally in parallel. For example, in a situation in which many small areas of interest are to be detached, even manual placement of a separately 3D printed mask can increase throughput and yield.

Various 3D printing techniques are suitable. For example, the 3D printing may be an additive manufacturing technique. The 3D printing may comprise the extrusion of a melted 3D printing material in layers, to build the 3D mask. This may comprise extruding 3D printing material in layers upon the tissue section. For example, the 3D printing may be done using Fused Deposition Modeling (FDM). Various 3D printing material may be used, in particular 3D materials that do not interact with the detaching liquid. For example, the 3D material may be, e.g., Polylactic Acid (PLA). Any suitable 3D printing material, e.g., a plastic, for printing may be used though. In an embodiment, a medical grade PP for 3d printing may be used; for example, a medical variant of PLA filaments. In addition to plastics, the mask material may be a wax with a higher melting point, grease, e.g., chemically inert, silicone caulk.

For example, the 3D printing may be done using a resin printer. For example, the 3D technology may be an SLA 3D Printer, e.g., an LCD-based SLA printer. For example, the 3D printing material may be a photosensitive resin.

The 3D printing material may be a melted plastic. In an embodiment, the 3D printing material may be a highly viscous liquid or gel. As an example, the gel may be a silicone gel.

An advantage of this approach is that the 3D mask may be dispensed by a pipette tip, e.g., attached to pipette arm 130, e.g., pipette tip 131. This avoids the needs for a separate 3D printer.

The 3D mask comprises barriers that define a cavity surrounding an area of interest on the tissue section. The cavity is open at a side facing the area of interest on the tissue section. This allows the detaching liquid to work on the tissue in the area of interest. The barriers cause the detaching liquid to stay at the area of interest instead of flowing out to the rest of the tissue section.

The 3D mask is arranged to receive the detaching liquid, e.g., a lysing liquid. For example, in an embodiment, the 3D mask comprises an inlet arranged to allow detaching liquid to be inserted into the cavity by a pipetting tip. For example, the cavity may be at least partially open at a side opposite the tissue section; the pipetting arm can move toward the partially open side and insert the detaching liquid. For example, in the 3D mask one or more ducts may be printed to transport the detaching liquid to and from the pipetting tip. For example, multiple cavities may be provided with an inlet each; the multiple inlets may be connected to a single inlet for the mask.

The cavity may have an area of only 1 mm^2, though larger is possible, e.g., 1250 mm^2 area, or even larger. The largest diameter of the cavity in the 2D direction may be as small as, say, 1 mm, but much larger is also possible, say, 20 mm or even larger. The height of the barriers depend on the amount of detaching liquid that will be used, which in turn may depend on the time that detaching will take. As an example, a height of 3 mm may be used. Lower or higher barriers are possible though. The barriers may be as thin as the strength of the 3D material allows. As an example, a thickness of between 1 and 2 mm may be used. Higher and lower values are possible. A desired height may be indicated in the 2D design as gray values, although this is not needed.

In an embodiment, the outer side of the barriers are provided with a sloping support. FIG. 4c shows such a support at the outer edge of the mask. For example, the support may be twice as thick as the barrier at the side of the tissue. For example, the support may be about 5 mm wide. Towards the top of the barrier, away from the tissue, the barrier may become thinner. A wide support, especially at the outer edge of a barrier has the advantage that a better seal for the cavity is obtained.

In an embodiment, the barriers defining the cavity match the edges of the area of interest. The shape of the cavity can follow the shape of the area of interest and can be irregular. For example, the 2D shape of an area of interest may be an irregular polygon or a shape defined by a spline, etc. in an embodiment, the 3D printing comprises obtaining a 3D design of the mask, said 3D-printing being steered from the 3D design of the mask.

In an embodiment, the 3D mask is printed directly on the tissue section on top of the slide, e.g., using FDM printing, or the like. Printing directly on the tissue is not necessary but is advantageous. It provides a better seal for the cavity, and avoids an additional step of placing the mask on the tissue. In an embodiment, applying a 3D printed mask comprises 3D printing the 3D printed mask directly upon the tissue section.

Some tissue sections come with a paraffin layer. An advantageous additional step when printing directly on a tissue section, is to first remove a paraffin layer. Any conventional deparaffinization method may be used, both manual and automated. For example, one may apply a deparaffinization regime using the pipetting tip. In an embodiment, at least part of the tissue section where the 3D printed mask is to be applied is deparaffinized. Note that for deparaffination it is not required to restrict deparaffinization liquid(s) to areas of interest. A larger area, or even the entire tissue section may be deparaffinized. For example, e.g., xylene may be applied to the tissue section to deparaffinize; other deparaffinization methods are known in the art. An advantage of deparaffinization is that the 3D printed mask attaches better to the tissue section. For example, in an embodiment, deparaffinization is followed by FDM printing. Experiments showed that deparaffination significantly improves the bond between a 3D printed mask printed on the tissues section and the tissue section.

An advantage of using 3D mask is that less lysis buffer per area is needed compared to the tip extender technology. In particular this means that an unstained tissue section for detaching can be much thicker than a stained tissue section. For example, in an embodiment, the tissue section for detaching is at least 2 times as thick as the stained tissue section, at least 4 times as thick as the stained tissue section, or at least 8 times as thick as the stained tissue section.

For example, typically a stained tissue section may be, say, 4-5 micron thick. The unstained tissue section for detaching could be much thicker; For example, between 10 and 40 micron thick; For example, a thickness of 10 micron or more, or 20 micron or more, etc.

Once the 3D mask has been applied, e.g., printed on the tissue, or printed off the tissue, but placed on it, a detaching liquid is dispensed into a cavity defined by the 3D mask, and covering the area of interest. The detaching liquid is then allowed to detach the tissue.

An advantageous choice for a detaching liquid is a lysing liquid, e.g., a lysing buffer. Lysing a tissue section with a lysing liquid causes the formation of a lysate comprising the lysed tissue material.

For example, to dispense the detaching liquid and/or aspirated it a pipette tip arranged at a motorized pipettor arm may be moved to the cavity, where the detaching liquid may be dispensed directly into the cavity. It is also possible to liquidly connect to the cavity; for example, in the 3D mask liquid channels may be printed connecting to the cavity or cavities. The liquid channel may be arranged to receive the detaching liquid from the pipette tip.

In an embodiment, different detaching liquids may be dispensed to different areas of interest, e.g., to different cavities. For example, different tissue types may be detached with a detaching liquid optimized for the particular tissue. For example, the different detaching liquids may comprise different enzymes, or different concentrations, or the like.

Once the detaching liquid has been supplied, it is allowed to detach the tissue at the area of interest. The pipetting tip may control exposure of the tissue to chemicals, but may also be configured to allow liquid forces, e.g., shear forces at the pipetting tip, e.g., in a detachment chamber, e.g., the cavity. Applying shear forces in the cavity during detaching may shorten the detachment time, but a downside is that it will occupy the pipetting tip. This is not needed though, in fact, an advantage of using a 3D printed mask, is that the pipetting tip is not needed during the detaching. For example, the pipettor arm may move away from the cavity during the detaching of the tissue at the area of interest, and to return later to the cavity to aspirate the detaching liquid from the cavity. The pipettor arm could return once or more times during detaching, e.g., for applying shear forces, e.g., mixing the detaching liquid. This is not necessary, though, the pipettor tip could be at the cavity only twice, e.g., first to dispense the detaching liquid, later to aspirate the detaching liquid together with detached tissue.

In an embodiment, detaching liquid may be aspirated and replaced with a new batch of detaching liquid in the same cavity. However, typically this is not needed as the volume of the detaching cavity can be controlled as well as the time for detaching. Accordingly, in an embodiment, detaching liquid is dispensed into a cavity only once. For example, a lysing liquid might not be replaced in the cavity before or after aspirating the lysate from the cavity. For example, a cavity is filled with lysing liquid only once. For example, lysate is aspirated from a cavity only once. In an embodiment, there is no exchange of lysing liquid during the lysing.

The tissue slide may be left in the pipetting part of a detaching machine. The slide together with the 3D mask(s) and detaching liquid in its cavity(s) may be placed in an incubator, where the detaching liquid is enabled to detach the tissue. An incubation chamber may have a controlled temperature and/or controlled humidity. For example, the temperature may be controlled to be at 56° C., and/or the humidity may be controlled to be at 95%. The required temperature and/or humidity may depend on the detaching liquid and tissue type.

For example, one or more 3D masks may define multiple cavities on the tissue section. Detaching liquid may be dispensed to the multiple cavities, so that the detaching in the multiple cavities progresses in parallel. This means that a single pipetting tip may service multiple cavities, e.g., multiple areas of interest, wherein detaching progresses in parallel. Using this approach a higher throughput can be obtained, without increasing the number of pipetting tips and arms, and maintaining, or even increasing the precision with which the areas of interest are detached.

The multiple cavities in which detaching progresses in parallel may be on the same tissue section on the same tissue slide, but even higher throughput is possible when combining multiple tissue slides. For example, in an embodiment, multiple 3D printed masks are applied on multiple tissue sections on multiple tissue slides. The detaching liquid is dispensed in the resulting cavities on the multiple tissue sections. The multiple tissue slides may be placed in an incubation chamber, wherein the detaching liquid is allowed to detach the tissue.

The tissue slides may be collected in a stack and placed in the incubation chamber as a stack. The stack could also be in the incubation chamber where slides are stacked.

For example, a detaching method may comprise
  applying one or more 3D masks to a tissue section defining one or more cavities,
  dispensing detaching liquid to the one or more cavities,
  placing the 3D tissue slide in an incubation chamber,
  repeating the applying, dispensing and placing
  retrieving a tissue slide from the incubation chamber and aspirating detaching liquid from the one or more cavities,
  repeating the retrieving and aspirating.

For example, a detaching method may comprise
  applying one or more 3D masks to a tissue section defining one or more cavities,
  dispensing detaching liquid to the one or more cavities,
  placing the 3D tissue slide in stack,
  repeating the applying, dispensing and placing
  placing the stack in an incubation chamber,
  obtaining the stack from the incubation chamber, retrieving a tissue slide from the stack and aspirating detaching liquid from the one or more cavities, repeating the retrieving and aspirating.

Instead of forming the stack outside of the incubation chamber, the stack may be formed inside the chamber. This has the advantage that slides can be put immediately in the chamber, but has the downside that more slide manipulation machinery is needed in the chamber.

For example, multiple printed cavities may be filled with lysate buffer at room temperature. Put the tissue slide an incubator, e.g., as part of a stack, from some time, e.g., for an hour or so. The incubator may be at 56° C. or so, e.g., a temperature where the detaching liquid becomes active. Humidity may be controlled as well, e.g., at 95% rH.

During the detaching of the tissue at the area of interest the temperature of the tissue section may be increased. This may be done in an incubation chamber, but could also be done by a slide support with a heating element, e.g., in a pipetting chamber.

Detaching at a defined location on the tissue section may optionally comprise heating the detaching liquid in the detachment chamber to a detaching temperature. For example, the heating may be done by a heating element at the opposite side of the tissue section as the pipetting tip. Heating may speed up the detaching.

Once detaching has finished or has progressed sufficiently, the detaching liquid with the detached tissue, e.g., the lysate, may be aspirated from the cavity. The aspirated detaching liquid can then be forwarded for further processing. This could be in the same detaching machine, or in a different analyzing machine. For example, further processing may comprise eluting lysate into an MP well, microplate, or the like. Further processing may comprise storage of the liquid, e.g., temporary or long term storage. For example, the further processing may comprise genomic analysis of the detached tissue, and/or extracting of biomolecules from the detached tissue, such as one or more of nucleic acids, proteins, lipids, and hormones.

The detaching device may be configured, for example, to extract biomolecules from the detached tissue material, e.g., one or more of nucleic acids, proteins, lipids, and hormones. For example, the detaching device may be configured to aspirate detached tissue material, e.g., the detaching liquid, and to depose it in a detaching liquid collection vessel. For example, the vessel may be a well, a tube, in particular, an Eppendorf Tube, a microplate, and so on. The detaching device may comprise the vessel, e.g., inside detaching unit 140 or the like. A detaching device may be configured for further processing of the detaching liquid, e.g., purifying, obtaining particular biomolecules, etc. The detaching device may also be arranged for the detaching liquid to be collected and processed by a different machine.

Interestingly, 3D masks may also be applied for specific staining. In that case the tissue at the area of interest is not detached but stained. For example, such staining may be applied in Immune Histo Chemistry (IHC)), e.g., based on antibodies. The freeform cavities may be used to do several staining on one section. For example, a grid of wells, e.g., cavities, may be printed on an area of interest and each well could have a different antibody staining dispensed in it. In an embodiment, a pattern of multiple stainings may be repeatedly used; as an example, one could take 4 stainings.

In an embodiment, different staining liquids may comprise different staining or different antibodies. For example, two areas of interest on a tissue section may be provided with a different staining liquid. In an embodiment of a method for staining tissue from a tissue section on a tissue slide, comprises applying a 3D printed mask on top of the tissue section, the mask comprising barriers that define a cavity surrounding an area of interest on the tissue section, the cavity being open at a side facing the area of interest on the tissue section, dispensing a staining liquid to the cavity, and allowing the staining liquid to stain tissue at the area of interest, and aspirating the staining liquid from the cavity.

For example, the 3D mask for the staining method may be derived from an initial stained tissue section, which is a different section of the same tissue, e.g., the section which is the be stained with a method according to an embodiment. The initial staining may be a conventional staining, e.g., not using a 3D mask. In the initial staining at least the area of interest is visible, e.g., is stained, e.g., to guide dispensing and 3D mask design, printing and/or applying. Typically, the entire initial tissue section would be stained Details of dispensing, and design and application of a 3D mask, and the like, as described herein, may be applied in the staining method as well. In particular, the 3D mask could be printed directly on the tissue section. The staining method may be practiced in a detaching machine as described herein. The detaching device could be specialized to a staining device.

In the various embodiments of a detaching machine, a communication interfaces may be selected from various alternatives. For example, the interface may be a network interface to a local or wide area network, e.g., the Internet, a storage interface to an internal or external data storage, an application interface (API), etc.

A detaching machine may have a user interface, which may include well-known elements such as one or more buttons, a keyboard, display, touch screen, etc. The user interface may be arranged for accommodating user interaction for configuring the systems. User interaction may comprise one or more of: define one or more areas of interest, confirm suggested defined locations, start detaching, review detaching progress, etc.

Typically, a detaching machine comprises a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5:
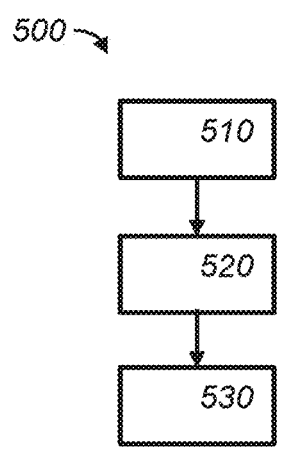

FIG. 5 schematically shows an embodiment of a detaching method 500 for detaching tissue from a tissue section on a tissue slide. Method 500 comprises applying (510) a 3D printed mask on top of the tissue section, the mask comprising barriers that define a cavity surrounding an area of interest on the tissue section, the cavity being open at a side facing the area of interest on the tissue section, dispensing (520) a detaching liquid to the cavity, and allowing the detaching liquid to detach tissue at the area of interest, aspirating (530) the detaching liquid with the detached tissue from the cavity, and forwarding the liquid for further processing.

A computer may implement some or all of the parts of method 500. For example, a computer may control the applying of a 3D printed mask, e.g., by controlling the printing of the 3D mask on the tissue. For example, a computer may control the dispensing and aspirating of a detaching liquid, e.g., by controlling the movement of a pipetting arm and controlling the action of the tip. A computer may be configured to generate a 2D and/or 3D design of a 3D mask for use in detaching.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the devices, units and/or parts of at least one of the systems and/or products set forth.

Figure 6A:
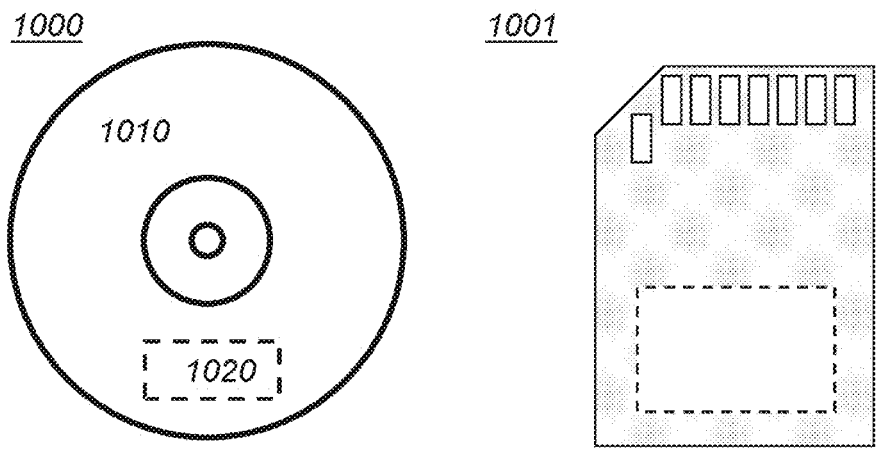

FIG. 6a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a detaching method and/or a 3D printing method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said lysing method and/or tracking method.

For example, computer-implemented, e.g., computer controlled operations, may include: operating the pipette tip, e.g., dispensing and aspirating of detaching liquid, operating the pipettor arm and/or tip, e.g., moving the pipettor arm, 3D-printing, controlling temperature, obtaining a 2D and/or 3D design for the 3D printed mask, and other examples such as mentioned herein.

Figure 6B:
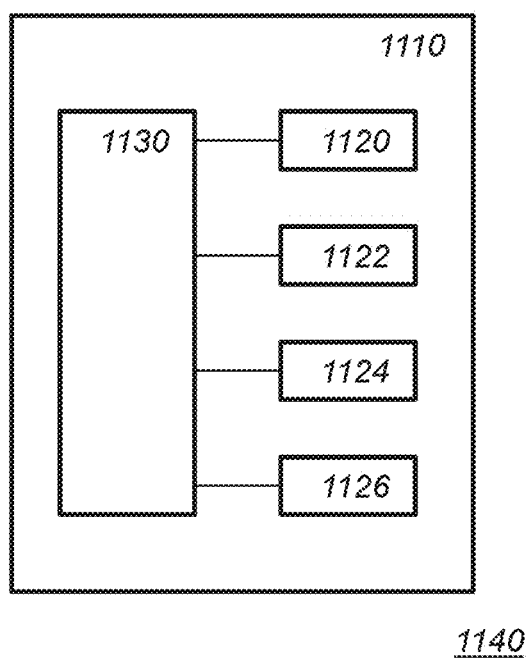

FIG. 6b shows in a schematic representation of a processor system 1140 according to an embodiment of a detaching device and/or an embodiment of a 3D printing device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., a tracking device or lysing device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1140 is shown as including one of each described component, the various components may be duplicated in various embodiments. For example, the processor may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor may include a first processor in a first server and a second processor in a second server.

In an advantageous embodiment, the 3D printed mask comprises paraffin, e.g., is printed from paraffin. This is especially advantageous if the tissue is paraffin embedded and the 3D mask is directly printed upon the tissue. Printing a 3D mask from paraffin onto a paraffin embedded tissue ensures a good connection between mask and tissue without deparaffination.

In an embodiment, the 3D printed mask is printed directly upon the tissue section, the tissue section is embedded in a first paraffin and the 3D printed mask comprising a second paraffin. The second paraffin is different from the first paraffin. The first paraffin and the second paraffin are chosen such that the melting point of the first paraffin is lower than that of the second paraffin. For example, in an embodiment, a melting point of the first paraffin is lower than a melting point of the second paraffin, the 3D printed mask being printed directly upon the tissue section. All melting points are considered at a standard pressure of 1 atmosphere.

Having a lower melting point for the first paraffin than the second paraffin means that detachment can be effectively performed by, after application of the 3D printed mask, heating the tissue slide to a detachment temperature between the melting points of the first paraffin and the second paraffin, e.g., to a point halfway between these melting point temperatures, to a detachment temperature at a point between 10% and 90% of the temperature difference of the melting difference.

As a result, the embedding first paraffin will melt, while the second paraffin that builds the cavity around the area of interest will not melt. At this point a detaching liquid such as a lysis buffer may be introduced into the cavity formed by the second paraffin. As the walls formed by the second paraffin remain intact, the walls will contain the detaching liquid in the cavity. As the paraffin embedding the tissue section melts, the first paraffin does not obstruct the tissue from being detached by the detachment liquid. For more efficient detachment, a sufficient quantity of a detergent may be added to the detachment liquid.

Typically, before being embedded in paraffin, the tissue section will previously have undergone a suitable treatment, e.g., one or more of the group: fixation, dehydration, and clearing. In particular the tissue section may be FFPE tissue, e.g., formalin fixed paraffin embedded tissue. Latex, dimethyl sulfoxide, and proprietary "plasticizers" may optionally be included in the formulation in order to modify the texture and malleability of the final tissue sample. See, e.g., the paper "Tissue Handling and Specimen Preparation in Surgical Pathology Issues Concerning the Recovery of Nucleic Acids From Formalin-Fixed, Paraffin Embedded Tissue", by Stephen M. Hewitt, et al., for examples of paraffin application in tissue sections; the paper is included herein by reference.

Paraffins have different melting points. For example, paraffins with a low melting point, e.g., at most 65° C., e.g., in a range from 55° C. up to 63° C., may be used as the first paraffin to embed the tissue section.

As an example, in an embodiment, the melting point of the first paraffin is at least 5 degrees Celsius lower than the melting point of the second paraffin. A temperature difference of 5 degrees facilitates heating the tissue section and mask to the detachment temperature.

For example, the first paraffin may have a melting pointing in the range of 55° C.-63° C., and the second paraffin may have a melting point of at least 60° C., for example, the second paraffin may have a melting point of at least 100° C. For example, the second paraffin may have a melting point in the range from 60° C. up to 250° C.

For example, the commercially available 3D printing filament, 'print2cast' has a melting point of 117 degrees Celsius. The paper 'Process Parameter Optimization for 3D Printed Investment', by Muslim Mukhtarkhanov (included herein by reference) lists various options for 3D printed parts made of wax filament; the paper also lists options for suitable 3D printing technologies. In particular, table 2 lists commercially available castable filaments suitable for FDM (Fused deposition modeling).

In fact, the second paraffin may have a considerably higher melting point than the first paraffin. For example, in an embodiment, the second paraffin has a melting point of over 100° C., or even over 150° C., or even over 200° C. Such a high melting point may degrade the RNA or DNA in the tissue section at the point where the 3D mask is printed.

This is not a problem however, as the degrading is limited to a small area near the 3D printed mask.

In an embodiment, of the detaching device, the 3D printer is configured for applying a 3D printed mask comprising a second paraffin directly on top of a tissue section arranged on the tissue slide, the tissue section being embedded in a first paraffin having a lower melting point than the second paraffin. In an embodiment, a 3D printed mask is arranged for applying on top of a tissue section embedded in a first paraffin having a lower melting point than the second paraffin.

In an embodiment, a 3D printed mask comprising a second paraffin is combined with a staining liquid instead of detaching liquid.

Below a number of illustrative examples are given of detaching using a paraffin mask.

Example 1. A method for detaching tissue from a tissue section on a tissue slide, the tissue section being paraffin-embedded in a first paraffin, the method comprising printing a 3D printed mask directly on top of the tissue section, the mask comprising barriers that define a cavity surrounding an area of interest on the tissue section, the cavity being open at a side facing the area of interest on the tissue section, the 3D printed mask comprising a second paraffin, a melting point of the first paraffin being lower than a melting point of the second paraffin, dispensing a detaching liquid to the cavity, and allowing the detaching liquid to detach tissue at the area of interest, aspirating the detaching liquid with the detached tissue from the cavity, and forwarding the liquid for further processing.

Example 2. A method as in Example 1, wherein the detaching liquid is dispensed and/or aspirated from a pipette tip arranged at a motorized pipettor arm, said arm being arranged to move the pipette tip to the cavity.

Example 3. A method as in any one of Examples 1-2, comprising heating the tissue slide with a heating element for heating the tissue section on the tissue slide during detaching such as lysing, to a temperature between a melting point of the first paraffin and a melting point of the second paraffin Example 4. A method as in any one of Examples 1-3, comprising placing the tissue slide in an incubation chamber, wherein the detaching liquid is heated and allowed to detach the tissue.

Example 5. A method as in any one of Examples 1-4, wherein the first paraffine layer is not removed from the tissue section before applying the 3D printed mask on top of the tissue section.

Example 6. A method as in any one of Examples 1-5, wherein the 3D mask is printed using fused deposition modeling using a paraffin filament.

Embodiment using paraffin may be combined with other embodiments, e.g., as claimed, or as described herein.

The following numbered clauses are not the claims, but include contemplated and non-limiting examples:

Clause 1. A method (500) for detaching tissue from a tissue section on a tissue slide, the method comprising
- applying (510) a 3D printed mask on top of the tissue section, the mask comprising barriers that define a cavity surrounding an area of interest on the tissue section, the cavity being open at a side facing the area of interest on the tissue section,
- dispensing (520) a detaching liquid to the cavity, and allowing the detaching liquid to detach tissue at the area of interest,
- aspirating (530) the detaching liquid with the detached tissue from the cavity, and forwarding the liquid for further processing.

Clause 2. A method as in Clause 1, wherein the detaching liquid is dispensed and/or aspirated from a pipette tip arranged at a motorized pipettor arm, said arm being arranged to move the pipette tip to the cavity.

Clause 3. A method as in Clause 2, wherein the pipettor arm is configured to move away from the cavity during the detaching of the tissue at the area of interest, and to return later to the cavity to aspirate the detaching liquid from the cavity.

Clause 4. A method as in any one of the preceding clauses, wherein multiple cavities are defined by one or more 3D printed masks applied on the tissue section,
- detaching liquid being dispensed to the multiple cavities, the detaching in the multiple cavities progressing in parallel.

Clause 5. A method as in any one of the preceding clauses, comprising applying multiple 3D printed masks on multiple tissue sections on multiple tissue slides and dispensing a detaching liquid to resulting cavities on the multiple tissue sections, the method further comprising
- placing the multiple tissue slides in an incubation chamber, wherein the detaching liquid is allowed to detach the tissue.

Clause 6. A method as in Clause 5, collecting the multiple tissue slides in a stack of tissue slides, and placing the stack in the incubation chamber.

Clause 7. A method as in any one of the preceding clauses, wherein detaching liquid is dispensed into a cavity only once.

Clause 8. A method as in any one of the preceding clauses, wherein the barriers defining the cavity match the edges of the area of interest.

Clause 9. A method as in any one of the preceding clauses, wherein the cavity is at least partially surrounded by a sloping support.

Clause 10. A method as in any one of the preceding clauses, wherein a cavity shape of the cavity is irregular.

Clause 11. A method as in any one of the preceding clauses, wherein applying a 3D printed mask comprises 3D printing the 3D printed mask directly upon the tissue section.

Clause 12. A method as in any one of the preceding clauses, wherein a paraffine layer is removed from at least part of the tissue section where the 3D printed mask is to be applied, before applying the 3D printed mask on top of the tissue section.

Clause 13. A method as in any one of the preceding clauses, comprising obtaining a 2D design of the mask, converting the 2D design into a 3D design and 3D printing the 3D design to obtain the 3D mask.

Clause 14. A method as in Clause 13, comprising
- obtaining a picture of a stained tissue section, the stained tissue section being a different slice of the same tissue as the tissue section for detaching,
- identifying an area of interest on the stained tissue section,
- generating the 2D design from the identified area of interest.

Clause 15. A method as in any one of the preceding clauses, wherein the tissue section for detaching is at least 2 times as thick as a stained tissue section, at least 4 times as thick as the stained tissue section, or at least 8 times as thick as the stained tissue section.

Clause 16. A method as in any one of the preceding clauses, wherein the further processing comprises
- genomic analysis of the detached tissue, and/or
- extracting of biomolecules from the detached tissue, such as one or more of nucleic acids, proteins, lipids, and hormones.

Clause 17. A method as in any one of the preceding clauses, wherein the tissue section is an FFPE tissue section.

Clause 18. A method as in any one of the preceding clauses, comprising increasing the temperature of the tissue section during the detaching of the tissue at the area of interest.

Clause 19. A method as in any one of the preceding clauses, wherein the method is at least in part computer implemented.

Clause 20. A method as in any one of the preceding clauses, wherein the detaching liquid comprises a lysing liquid, the lysing liquid lysing the tissue at the area of interest.

Clause 21. A detaching device comprising
- a tissue support arranged to receive a tissue slide,
- a 3D printer for applying a 3D printed mask on top of a tissue section arranged on the tissue slide, the mask comprising barriers that define a cavity surrounding an area of interest on the tissue section, the cavity being open at a side facing the area of interest on the tissue section,
- a pipette tip arranged at a motorized pipettor arm, arranged to move the pipette tip to the cavity for dispensing a detaching liquid to the cavity and for aspirating the liquid from the cavity.

Clause 22. A 3D printed mask arranged for applying on top of a tissue section, the mask comprising barriers that define a cavity surrounding an area of interest on the tissue section, the cavity being open at a side facing the area of interest on the tissue section and at least partially open at a side opposite the tissue section, the cavity being arranged for receiving detaching liquid for detaching tissue at the area of interest.

Clause 23. A transitory or non-transitory computer readable medium (1000) comprising data (1020) representing instructions, which when executed by a processor system, cause the processor system to perform a method as in any one of clauses 1-20. In a variant of the above clauses, staining is used instead of detaching. For example, in an embodiment, a method for staining tissue from a tissue section on a tissue slide is provided. The staining method comprises
- applying a 3D printed mask on top of the tissue section, the mask comprising barriers that define a cavity surrounding an area of interest on the tissue section, the cavity being open at a side facing the area of interest on the tissue section, dispensing a staining liquid to the cavity, and allowing the staining liquid to stain tissue at the area of interest, aspirating the staining liquid from the cavity.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A method for detaching tissue from a tissue section on a tissue slide, the method comprising:
   (i) applying a 3D printed mask on top of the tissue section, the mask comprising barriers that define a cavity surrounding an area of interest on the tissue section, the cavity being open at a side facing the area of interest on the tissue section, wherein the 3D printed mask is 3D printed directly upon the tissue section,
   (ii) dispensing a detaching liquid to the cavity, and allowing the detaching liquid to detach tissue at the area of interest, and
   (iii) aspirating the detaching liquid with the detached tissue from the cavity, and forwarding the liquid for further processing.

2. The method as in claim 1, wherein the detaching liquid is dispensed and/or aspirated from a pipette tip arranged at a motorized pipettor arm, said arm being arranged to move the pipette tip to the cavity.

3. The method as in claim 2, wherein the pipettor arm is configured to move away from the cavity during the detaching of the tissue at the area of interest, and to return later to the cavity to aspirate the detaching liquid from the cavity.

4. The method as in claim 1, wherein multiple cavities are defined by one or more 3D printed masks applied on the tissue section, and wherein
   the detaching liquid is dispensed to the multiple cavities such that
   the detaching in the multiple cavities progresses in parallel.

5. The method as in claim 1, wherein the method comprises:
   applying multiple 3D printed masks on multiple tissue sections on multiple tissue slides and dispensing a detaching liquid to resulting cavities on the multiple tissue sections, and
   placing the multiple tissue slides in an incubation chamber, wherein the detaching liquid is allowed to detach the tissue.

6. The method as in claim 1, wherein the cavity is at least partially surrounded by a sloping support.

7. The method as in claim 1, wherein a cavity shape of the cavity is irregular.

8. The method as in claim 1, wherein the method comprises removing a paraffine layer from at least part of the tissue section where the 3D printed mask is to be applied, before applying the 3D printed mask on top of the tissue section.

9. The method as in claim 1, comprising:
   obtaining a 2D design of the mask,
   converting the 2D design into a 3D design, and
   3D printing the 3D design to obtain the 3D mask.

10. The method as in claim 9, comprising
    obtaining a picture of a stained tissue section, the stained tissue section being a different slice of the same tissue as the tissue section for detaching,
    identifying an area of interest on the stained tissue section, and
    generating the 2D design from the identified area of interest.

11. The method as in claim 1, wherein the tissue section for detaching is at least 2 times as thick as a stained tissue section, at least 4 times as thick as the stained tissue section, or at least 8 times as thick as the stained tissue section.

12. The method as in claim 1, wherein the further processing comprises:
    genomic analysis of the detached tissue, and/or
    extracting of biomolecules from the detached tissue, such as one or more of nucleic acids, proteins, lipids, and hormones.

13. The method as in claim 1, wherein the method is at least in part computer implemented.

14. The method as in claim 1, wherein
    the tissue section is an FFPE tissue section, and/or
    the detaching liquid comprises a lysing liquid, the lysing liquid lysing the tissue at the area of interest.

15. The method as in claim 1, wherein the tissue section is paraffin-embedded in a first paraffin, the 3D printed mask comprising a second paraffin, a melting point of the first paraffin being lower than a melting point of the second paraffin, the 3D printed mask being printed directly upon the tissue section.

16. A non-transitory computer readable medium comprising data representing instructions, which when executed by a processor system, cause the processor system to perform the method as in claim 1.

17. A method for staining tissue from a tissue section on a tissue slide, the method comprising:
    (i) applying a 3D printed mask on top of the tissue section, the mask comprising barriers that define a cavity surrounding an area of interest on the tissue section, the cavity being open at a side facing the area of interest on the tissue section, wherein the 3D printed mask is 3D printed directly upon the tissue section,
    (ii) dispensing a staining liquid to the cavity, and allowing the staining liquid to stain tissue at the area of interest, and
    (iii) aspirating the staining liquid from the cavity.

18. A non-transitory computer readable medium comprising data representing instructions, which when executed by a processor system, cause the processor system to perform the method as in claim 17.

* * * * *